(12) United States Patent
Kugler

(10) Patent No.: US 6,416,067 B1
(45) Date of Patent: Jul. 9, 2002

(54) VEHICULAR TRACTION SYSTEM

(75) Inventor: Michael W. Kugler, Hope Valley, RI (US)

(73) Assignee: Moroso Performance, Guilford, CT (US)

( * ) Notice: Subject to any disclaimer, the term of this patent is extended or adjusted under 35 U.S.C. 154(b) by 0 days.

(21) Appl. No.: 09/675,280

(22) Filed: Sep. 29, 2000

(51) Int. Cl.$^7$ .............................. B60G 7/00; B60P 7/00; B62D 7/00
(52) U.S. Cl. ....................................... 280/104; 280/93.1
(58) Field of Search ............................... 280/104, 124.1, 280/93.502, 93.503, 93.51, 124.135, 124.148, 124.153, 124.128, 683, 685

(56) References Cited

U.S. PATENT DOCUMENTS

| | | | | |
|---|---|---|---|---|
| 3,309,107 A | * | 3/1967 | Chieger | |
| 3,695,605 A | * | 10/1972 | Grossi | |
| 4,098,523 A | | 7/1978 | Valero | ........................ 280/718 |
| 4,132,431 A | * | 1/1979 | von der Ohe | |
| 4,614,359 A | * | 9/1986 | Lundin et al. | |
| 4,693,491 A | * | 9/1987 | Akatsu et al. | |
| 4,900,057 A | * | 2/1990 | Raidel | |
| 5,354,092 A | | 10/1994 | Calvert | ........................ 280/718 |
| 5,667,240 A | * | 9/1997 | Mitchell | |

\* cited by examiner

Primary Examiner—Brian L. Johnson
Assistant Examiner—Joselynn Y. Sliteris
(74) Attorney, Agent, or Firm—Cummings & Lockwood

(57) ABSTRACT

A traction device having particular applicability to front wheel drive vehicles is provided that includes an elongated cross member assembly and a pair of elongated members that are adapted to be pivotally mounted relative to the cross member and the vehicle's chassis. Appropriate brackets are provided to facilitate pivotal motion between the elongated cross member and the elongated members. Gusset brackets are also advantageously provided to facilitate mounting of the traction device to a vehicle's frame. The lengths of the elongated members are adjustable through interaction between threaded turn screws/rod ends and receptacles that include internal threading. Length adjustment helps to ensure optimal pivotal motion during use. Preliminary test results evidence improved vehicle performance in 60 FT times through use of the disclosed traction device.

17 Claims, 1 Drawing Sheet

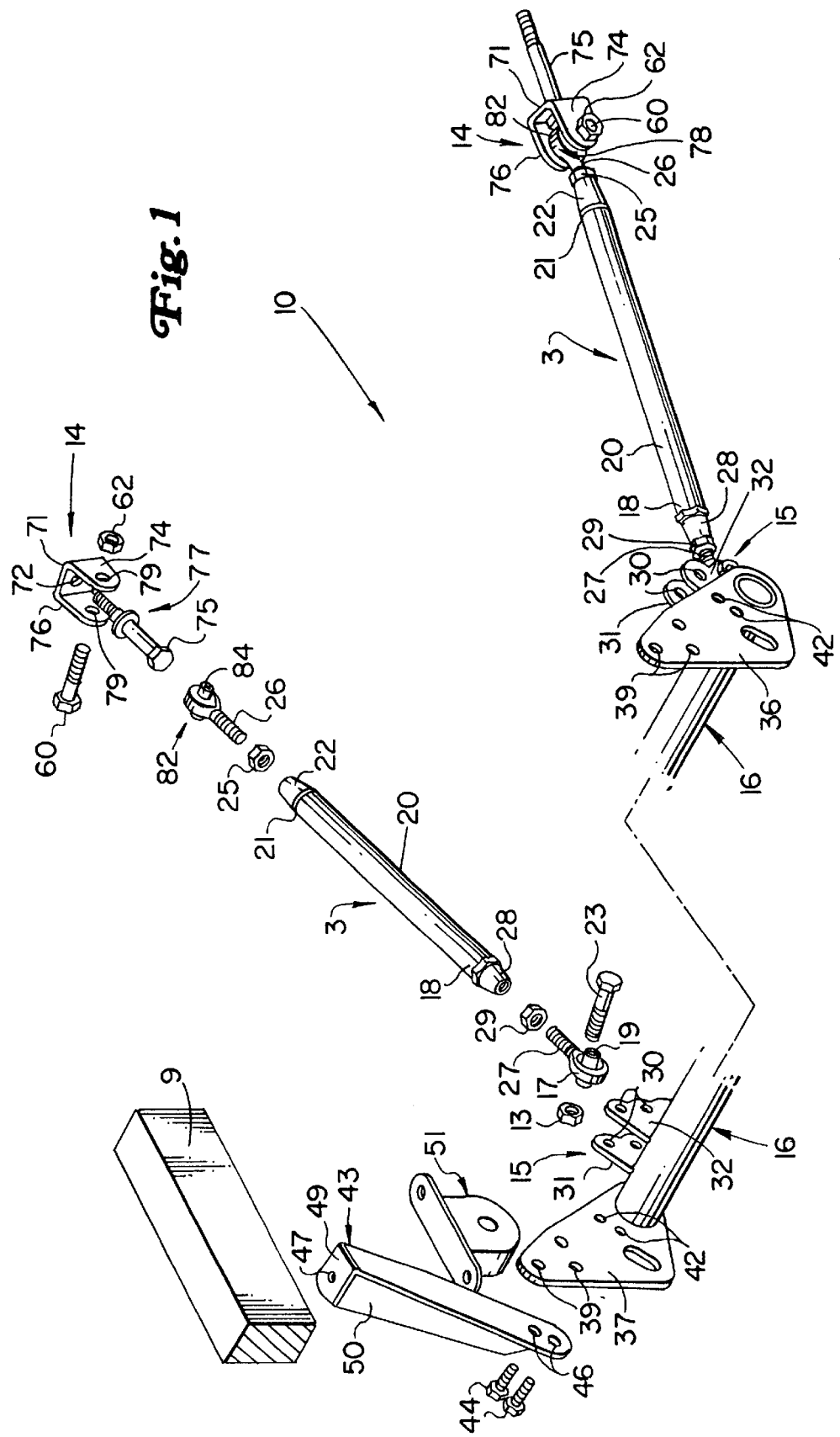

VEHICULAR TRACTION SYSTEM

BACKGROUND

1. Technical Field

The present disclosure relates to a system for enhancing the traction performance of vehicles, e.g., automobiles, and more particularly, to a system that enhances the efficiency and effectiveness of traction performance, particularly during vehicle acceleration, for front wheel drive vehicles.

2. Background Art

Devices and/or systems for enhancing traction between the wheels of a motor vehicle and a road surface have been developed and marketed in the automotive field. For example, U.S. Pat. No. 4,098,523 to Valerio ("the Valerio '523 patent" describes an effective system for improved traction for a rear wheel drive vehicle. Indeed, a device/system according to the Valerio '523 patent has been manufactured and marketed for several years by Competition Engineering, a division of Moroso Performance, the assignee of the present disclosure.

As described in the Valerio '523 patent, during pronounced vehicle acceleration, e.g., in drag racing, the forces on the rear spring and the rapid acceleration of the wheels result in decreased contact of the rear wheels with the road surface, thereby causing wheel hopping and/or inadequate traction due to less than optimum transfer of weight to the vehicle's rear wheels. The system shown in the Valerio '523 patent improved upon the standard traction bar that is typically secured to the rear axle housing and spring for each rear wheel by providing an innovative telescopic tubular assembly that could be advantageously deployed between the rear axle housing of the vehicle and the rear leaf spring.

More particularly, the system shown in the Valerio '523 patent provided a first member pivotally mounted to rear axle housing by a bracket assembly (inner member 3) and a second member pivotally mounted to the leaf spring by a second bracket assembly (outer member 6). An elastomeric member 10 is advantageously deployed between a pair of flanges (flanges 7 and 8) to absorb shock and transmit forces during operation of the device shown in the Valerio '523 patent. In the embodiment illustrated in the Valerio '523 patent, flange 8 extends from outer member 6, whereas flange 7 extends from a further outer member 5. Outer member 5 is advantageously fixed relative to inner member 3 by through bolt 12 that extends through aperture 33. Thus, inner member 3 and outer member 5 are adapted for conjoint movement. Inner member 3 extends within outer member 6 for a distance sufficient to ensure that members 3 and 6 remain in cooperative relation once mounted to a vehicle.

The elastomeric member 10 provided by the Valerio '523 patent is disclosed to have an endless band construction and be fabricated form a relatively hard material, e.g., rubber having a durometer of 65–70. As disclosed in the Valerio '523 patent, utilization of an elastomeric member having the disclosed "durometer, width and length sufficient movement of the outer member 6 and adequate cushioning whereby the forces exerted on the connection between the first outer member 5 and inner member 3 as well as of the connections between the inner member 3 and the outer member 6 and their respective mountings to the vehicle during acceleration to provide sufficient compression to the elastomeric member 10 and proper distribution of the area of shock, combined with relative movement of the outer member 6 on the inner member 3, to minimize damage to the device when in operation." The entire contents of U.S. Pat. No. 4,098,523 to Valerio are incorporated herein by reference.

A further product directed to improved traction for motor vehicles is described in U.S. Pat. No. 5,354,092 to Calvert and is commercially available from Calvert Racing (Lancaster, Calif.). The "Cal-Tracs System" includes a rear support assembly bolted adjacent to a leaf spring opposite to a rear axle, a front support assembly pivotally attached to a front end of the leaf spring, and a rigid link which extends between and is attached to both the front and rear support assemblies at locations spaced from the leaf spring. The front support assembly includes a pair of generally triangular plates wherein a bolt is provided at each apex to connect the plates. A first upper bolt extends through a front spring eye of the leaf spring to provide a pivot axis for the front support assembly. A second upper bolt is positioned to extend across an upper surface of the leaf spring at a location spaced rearwardly from the front spring eye, to limit pivotal movement of the front support assembly relative to the leaf spring. A third bolt extends between the plates at a lower end thereof to secure a front end of the rigid link. This rigid link includes an elongated link tube or bar having eye connectors threaded into the front and rear ends thereof. The eye connectors have opposite threads relative to one another such that rotation of the elongated bar about its longitudinal axis changes the overall length of the rigid link.

Despite the efforts to date in improving traction performance of vehicles, several opportunities for improved performance and use are apparent, particularly in the realm of drag racing where tremendous vehicle acceleration occurs. Moreover, a need exists for a system that improves traction performance for front wheel drive vehicles. In improving system performance, e.g., in translating forces for improved traction, it is essential that the overall system operate without failure or fatigue. These and other objectives are met by the traction device of the present disclosure.

SUMMARY OF THE DISCLOSURE

The system of the present disclosure is designed for use in automotive applications desiring superior traction performance, particularly front wheel drive automotive systems. The system finds particular utility within front wheel drive vehicles adapted for racing, e.g., Stock Eliminator and Bracket Racing vehicles. However, the presently disclosed system may be advantageously employed in non-racing vehicles to gain the superior performance characteristics enabled thereby.

In a first preferred embodiment of the traction system of the present disclosure, a system for enhancing vehicle traction is provided that includes an adjustable strut assembly that is adapted to be pivotally mounted between a vehicle's front suspension and its chassis. The tubular strut assembly is pivotally and adjustably connected to the front suspension at a first end thereof, preferably by a clevis mounting bracket fixably secured to the front suspension. A second end of the tubular strut is preferably adapted to be adjustably and pivotally mounted to the vehicle's chassis.

The pivotal mount of the tubular strut assembly according to the present disclosure advantageously facilitates angular adjustment of the tubular strut assembly relative to the vehicle. Thus, according to the structural configuration described herein, shock forces experienced by or exerted on the vehicle's front suspension, e.g., during vehicle acceleration, are advantageously transmitted to the chassis. This shock absorption/transmission functionality enhances the life of a vehicle's drive train components and advantageously reduces weight transfer from the front drive wheels, thereby enhancing traction between the front drive wheels and the road.

Further features, uses and advantages associated with the traction system disclosed and claimed herein will become apparent from the figures and detailed description of preferred embodiments which follow. However, the present disclosure is not to be limited by the preferred embodiments disclosed herein, but such preferred embodiments are intended to be merely exemplary systems according to the invention disclosed and claimed herein.

BRIEF DESCRIPTION OF THE DRAWINGS

Preferred embodiments of the present disclosure are described hereinbelow with reference to the drawings, wherein FIG. 1 is an exploded perspective view of a traction device according to the present disclosure.

DETAILED DESCRIPTION OF THE EMBODIMENT(s)

The traction device of the present disclosure finds widespread application in the automotive field, and particularly in the automotive racing field, e.g., for Stock Eliminator and Bracket Racing vehicles, for front wheel drive vehicles.

Referring to FIG. 1, a traction device 10 is depicted according to the present disclosure. Traction device 10 is advantageously adapted to be suspended between a vehicle's front suspension (not pictured) and chassis (not pictured), as will be apparent to persons skilled in the art. As described in greater detail hereinbelow, traction device 10 is advantageously adapted to be pivotally and axially adjustably attached to a vehicle's front suspension arm by a bracket arrangement 14, for example a clevis bracket, and to be pivotally and axially adjustably attached to a vehicle's chassis, at least in part through use of a cross member 16.

Of note, traction device 10 is largely symmetric relative to the midpoint of cross member 16, and includes a pair of elongated assemblies 3 that extend substantially transversely relative to cross member 16. Each elongated member 3 includes an elongated body portion 20, a receptacle 22 adjacent a distal end 21 of elongated body portion 20, and a receptacle 28 adjacent a proximal end 18 of elongated body portion 20. Elongated member 20 is preferably of a hollow metal construction and may be either curved or polygonal in cross-section. In a preferred embodiment, elongated member 20 is advantageously fabricated from a radiused rod tube.

Receptacle 22 is preferably of tapered geometry and has an internal right hand thread (not pictured) for receiving turn screw 26. The interaction between the internal thread adjacent the distal end 21 of elongated body portion 20 and turn screw 26 facilitates axial adjustment of elongated member 3 relative to the vehicle's front suspension (not pictured). A jam nut 25 is preferably provided for use in securing turn screw 26 in a desired position.

Receptacle 28, in turn, is also preferably tapered and includes an internal left hand thread (not pictured) for receiving turn screw 27. As with the interaction between the internal thread at distal end 21 and turn screw 26, interaction between turn screw 27 and the internal thread at the proximal end 18 of elongated body portion 20 facilitates axial adjustment of elongated member 3 relative to transversely oriented cross member 16. A jam nut 29 is preferably provided to secure turn screw 27 in a desired position.

Receptacles 22 and 28 are generally fixedly joined to elongated member 20. In a first embodiment, one or both of receptacles 22, 28 may be integrally formed with elongated member 20. In an alternative embodiment, one or both of receptacles 22, 28 may be welded to elongated member 20.

According to traction device 10 of the present disclosure, elongated member 20 is pivotally and adjustably mounted relative to bracket arrangement 14. Bracket arrangement 14 generally includes a base plate 71 with an aperture 72 formed therethrough. Aperture 72 facilitates mounting of bracket arrangement 14 to a vehicle's front suspension (not pictured) by extending threaded bolt 75 (with washer 77) through aperture 72 and securing bolt 75 to the front suspension with an appropriately sized nut. Base plate 71 preferably includes at least one pair of integral side plates 74, 76. Side plates 74, 76 are typically perpendicularly oriented relative to base plate 71 and include aligned apertures 79 that are journaled to define a pivot 78. In a preferred embodiment, pivot 78 is formed by extending a bolt 60 through the aligned apertures (and rod end 82, as described hereinbelow) and securing such bolt 60 with a nut 62.

To achieve the desired pivotal relationship between elongated member 20 and bracket arrangement 14, rod ends 82 are typically formed on ends of turn screws 26 opposite their respective exposed threaded ends. Rod ends 82 typically define substantially closed loops of sufficient inner diameter to permit passage of bolt 60 therethrough. Rod ends 82 may be joined to turn screws 26 in a variety of fashions, e.g., rod ends 82 may be integrally formed with turn screws 26, threaded thereon, or welded thereto. In a preferred embodiment, rod ends 82 include cross channel tubes 84 positioned within an inner diameter thereof. Cross channel tubes 84 are sized and configured to permit passage of bolts 60 therethrough, and function to stabilize pivotal motion therebetween. Thus, by passing bolts 60 through rod ends 82 (and cross channel tubes 84, if present) and apertures 79 in side plates 74, 76, and securing bolts 60 with nuts 62, elongated member 20 is pivotally mounted relative to bracket assembly 14. By mounting bracket assembly 14 to a vehicle's front suspension (with bolt 75), elongated member 20 is effectively pivotally mounted relative to the front suspension.

With continued reference to FIG. 1 and turning to the proximal end 18 of elongated member 20, a bracket 15 includes a pair of side plates 31, 32 that are adapted to cooperate with elongated assembly 3. A plurality of spaced apertures 30 (FIG. 1) are defined in side plates 31, 32 to facilitate pivotal mounting of elongated assemblies relative thereto. Rod ends 17 are typically formed on ends of turn screws 27 opposite their respective exposed threaded ends. Rod ends 17 typically define substantially closed loops of sufficient inner diameter to permit passage of bolt 23 therethrough. Rod ends 17 may be joined to turn screws 27 in a variety of fashions, e.g., rod ends 17 may be integrally formed with turn screws 27, threaded thereon, or welded thereto. In a preferred embodiment, rod ends 17 include cross channel tubes 19 positioned within an inner diameter thereof. Cross channel tubes 19 are sized and configured to permit passage of bolts 23 therethrough, and function to stabilize pivotal motion therebetween. Thus, by passing bolts 23 through rod ends 17 (and cross channel tubes 19, if present) and a selected pair of apertures 30 in side plates 31, 32 of brackets 15, and securing bolts 23 with nuts 13, elongated members 20 are pivotally mounted relative to bracket 15. As shown in FIG. 1, side plates 31, 32 of bracket 15 are attached or secured to cross member 16 by appropriate means, e.g., by radial weldments or the like.

The transversely mounted cross member 16 is preferably fabricated of a hollow metal construction and is advantageously curved or polygonal in cross-section. Cross member 16 includes a pair of outwardly extending plates 36, 37 at either end thereof, secured by appropriate attachment means, e.g., by weldments or the like. Plates 36, 37 include a plurality of spaced apertures 39 for use in securing plates 36, 37 to a vehicle chassis using through bolts (not shown). Plates 36, 37 preferably include additional spaced apertures 42 for use in securing plates 36, 37 to gusset bracket 43.

Gusset bracket 43 defines a pair of spaced apertures 46 at a first end thereof for use in fixably attaching plates 36, 37 thereto using corresponding apertures 42, bolts 44 and nuts (not pictured). Gusset bracket 43 includes a flange 49 defining an aperture 47 for use in fixably securing gusset bracket to a vehicle chassis, shown schematically as a "Frame Rail" 9. Gusset bracket 43 may be attached to Frame Rail 9 by passing a bolt (not pictured) through aperture 47 and securing such bolt through a corresponding aperture formed in Frame Rail 9, as will be apparent to persons skilled in the art. Gusset bracket 43 and depending flange 49 are further advantageously supported or strengthened by depending upstanding side portion 50. Flange 49 and side portion 50 may be secured to gusset bracket 43 by conventional means, e.g., by weldments or the like. Gusset bracket 43 typically extends adjacent factory engine isolator 51.

In assembling traction device 10 according to the present disclosure, mounting bracket arrangement 14 is typically attached to a vehicle's front suspension and transverse cross member 16 along with gusset brackets 43, are mounted to the vehicle chassis. Elongated members 3 are pivotally mounted to bracket 15, as described hereinabove. Of note, the threaded portions of turn screws 27 are first inserted through jam nut 29 and into receptacle 28 of elongated body member 20 a sufficient distance to permit a desired level of pivotal movement between bracket 15 and elongated member 3. This assembly procedure is repeated to join elongated body member 20, receptacle 22 and turn screw 26 to bracket arrangement 14. In this way, elongated member 3 is pivotally mounted relative to bracket assembly 14. The lengths of elongated members 3 are adjusted by radial rotation of elongated body members 20 relative to the threaded portions of turn screws 26, 27, which facilitates elongation and/or shortening of elongated members 3, as appropriate.

By the foregoing installation of traction device 10, the forces due to acceleration are transmitted from the front suspension to the chassis, thereby counteracting the potential for wheel hop generated by suspension compliance. In addition, traction device 10 reduces weight transfer, thereby providing a dependable and long life to suspension components and maximized traction.

For purposes of further describing the operation, installation and use of a traction device according to the present disclosure, exemplary instructions for installation and adjustment are provided hereinbelow. However, the present disclosure is not intended to be limited to use and/or adjustment according to such exemplary instructions, but rather to be merely illustrated thereby.

Installation of Traction Device onto a Honda/Acura Vehicle:

The traction device system is a bolt-on package that is designed to enhance traction by eliminating wheel hop and promoting weight transfer to the front wheels. Installation of the traction device requires the permanent removal of the factory plastic splash pan located just behind the radiator support. No other modifications are generally required for installation.

| Parts | |
|---|---|
| (1) Cross member Assembly | (2) Radius Rod |
| (1) Cross member Support, LH | (1) Cross member Support, RH |
| (2) Link Bracket | (2) ½" Rod End, LH |
| (2) ½" Rod End, RH | (4) ⅜-24 Locknut |
| (4) ⅜"-24 × 1" Bolt | (4) ½"-20 × 2" Bolt |
| (2) ½"-20 × 4" Bolt | (2) ½"-20 Locknut |
| 2) ½"-20 Jam Nut, RH | (2) ½"-20 Jam Nut, LH |
| 2) ½"-i.d. Washer | (4) ½"-20 Thin Locknut |

Cross Member Installation
1. Raise and support the front of the vehicle.
2. Remove the front wheels and the splash pan under the radiator. Discard splash pan; it will not be reused.
3. Remove both shipping hooks located on the front frame rails by unbolting three (3) 10 mm bolts holding each bracket. Save the bolts for re-installation.
4. Slide the cross member assembly that includes cross member 16 into place so that the end brackets 36, 37 on cross member 16 align with the holes where the shipping hooks were previously mounted. Re-install the three (3) 10 mm bolts through apertures 39 in end brackets 36, 37 until finger tight.
5. Remove the forward-most bolt from the driver's side front engine anti-rotation mount located on the bottom of the front frame rail. Save the bolt.

Loosen the rear bolt two (2) turns.
6. Slip the end of gusset bracket 43 that has the hole/aperture 47 formed in flange 49 between the vehicle's anti-rotation mount and its frame rail.

Replace the front bolt finger tight. Swing the opposite end of the gusset bracket 43 down to the bracket 37 on the cross member 16. Insert two (2) of the supplied ⅜"-24×1" bolts through the apertures 46 formed in the gusset bracket 43 and the corresponding apertures 42 formed in the cross member brackets 37. Hold in place using the supplied ⅜"-24 locknuts finger tight. Repeat for the passenger side gusset bracket 43 and the bracket 36 formed on the cross member 16.

7. Tighten all bolts to 40 ft-lbs.
8. Locate the two (2) bolts that hold the factory lower suspension arm together. Remove the outermost nut from the bolt. Remove the bolt from the arm by driving it rearward with a hammer. One or two sharp blows with a hammer should remove the bolt from the factory press fit.
9. Install one of the supplied ½-20×4" bolts 75 and a flat washer 77 through the center hole in the gold link bracket 14. Insert the bolt 75, with link bracket 14, through the mounting hole in the suspension arm from the front side. Use the supplied ½" locknut to secure bolt 75. Tighten the bolt to 70 ft-lbs. Make sure that the side plates 74, 76 of the link bracket 14 are positioned level with the suspension arm.
10. Repeat the above process for the other side of the suspension.

Radius Rod Assembly
1. Assemble the jam nuts 25, 29 on all rod ends 17, 82 so that at least one (1) inch of turn screw (26, 27) threads will engage the strut rod (20) threaded ends. Apply anti-seize compound to the threads of the turn screws 26, 27 before installing them into strut rods 20. Thread all turn screws into the strut rod tubes until the jam nuts seat against the tube ends.

2. Install the radius rod assembly 3 into the clevis bracket 14 on the suspension arm. Secure it in place with the supplied ½"-20×2" bolt 60 and thin locknut 62. Torque to 70 ft/lbs.
3. Swing the front of the radius rod 20 so it aligns with the center hole on the brackets 15 that are joined to the cross member 16. Adjust the length of the tube 20 so that the mounting bolt 23 slides easily through both the brackets 15 and rod ends 17. Fasten in place with the supplied ½"-20×2" bolt 23 and locknut 13. Finger tighten only a
4. Re-install the wheels and lower the vehicle to the ground.

Adjustment

1. With the wheels pointing straight ahead, roll the vehicle back and forth about five (5) feet in either direction. This will settle the suspension and make for accurate adjustment.
2. With the strut rod jam nuts 25, 29 loosened, adjust the strut rod (20) length by turning until the front bolt 23 slides back and forth freely or you can turn the bolt 23 with your fingers. Tighten the jam nuts 25, 29. Torque the bolt to 70 ft/lbs.
3. Repeat this adjustment procedure for the opposite side.
4. Depending on the ride height of the vehicle, different angles of the strut rod may produce different levels of performance. Trying a different position in the front bracket 15 may produce better 60 ft-times. BOTH strut rods 20 should be set in the same hole location within brackets 15 for proper handling.

Test Results

In preliminary tests utilizing a traction device according to the present disclosure, vehicles equipped with the traction device demonstrated reduced 60 FT time as compared to vehicles without the traction device. In addition, vehicles equipped with a traction device according to the present disclosure evidenced improved 60 FT times as compared to vehicles equipped with conventional "wheelie bars." Test results are summarized in the tables set forth hereinbelow:

| Vehicle Parameters | Best 60 FT time |
| --- | --- |
| Vehicle without traction device or wheelie bar | 2.05 seconds |
| Vehicle with traction device, and without wheelie bar | 1.78 seconds |
| Vehicle with traction device and wheelie bar set ¾" off ground* | 1.71 seconds |
| Vehicle without traction device and with wheelie bar fully preloaded | 1.89 seconds |

*Wheelie bar was observed to touch the ground at the initial launch, preventing weight transfer off the front tires, and touched for an instant during the first to second gear shift; the wheelie bar remained off the ground for the remainder of the run.

Based on the foregoing preliminary test data, it is apparent that use of a traction device according to the present disclosure yielded a 0.27 second improvement as compared to a vehicle without a wheelie bar (1.78 vs. 2.05 seconds) and that use of the traction device with a wheelie bar mounted ¾" off the ground yielded a further 0.07 second improvement (1.71 vs. 1.78 seconds). In addition, a vehicle with a traction device according to the present disclosure performed 0.11 seconds better than a vehicle with a fully loaded wheelie bar (1.78 vs. 1.89 seconds).

While the present disclosure includes a description of a traction system and its use with reference to various specific embodiments, those skilled in the art will readily appreciate that various modifications, changes and enhancements may be made thereto without departing from the spirit or scope of the invention as defined by the appended claims.

What is claimed is:

1. A device for enhancing traction of a vehicle, comprising:
   (a) an elongated cross member assembly including a pair of spaced brackets welded thereto, said elongated cross member being fabricated from a hollow rod and adapted to be mounted to a vehicle's frame.
   (b) first and second elongated members including first mounting members at first ends thereof and second mounting members at second ends thereof, said first mounting members being adapted to be pivotally mounted to said spaced brackets;
   (c) first and second clevis brackets adapted to be mounted to a vehicle's front suspension, said second mounting members of said elongated members being adapted to be pivotally mounted to said first and second clevis brackets;
   wherein at least one of said first and second mounting members may be repositioned with respect to said first and second elongated members to adjust lengths thereof, thereby facilitating pivotal motion of said first and second elongated members relative to said pair of spaced brackets and said first and second clevis brackets.

2. The device of claim 1, wherein said elongated cross member has a first end, a second end and a pair of mounting plates, one of said pair of mounting plates being mounted to each of said first end and said second ends.

3. The device of claim 2, further comprising first and second gusset brackets, said first gusset bracket being mounted to one of said pair of mounting plates and the second gusset bracket being mounted to the other of said pair of mounting plates.

4. The device of claim 3, wherein said first and second gusset brackets include flanges and said flanges are adapted to be mounted to said vehicle's frame.

5. The device of claim 1, wherein each of said pair of spaced brackets include first and second side plates, and said first and second side plates each include a plurality of aligned apertures that are adapted to receive a bolt therethrough.

6. The device of claim 1, wherein said first and second elongated members are fabricated from hollow rods.

7. The device of claim 1, wherein said first and second elongated members include receptacles at said first and second ends thereof, said receptacles being internally threaded.

8. The device of claim 1, wherein said first and second mounting members include threaded turn screws having rod ends joined thereto, said rod ends defining an inner diameter sized and configured to receive a bolt therethrough.

9. The device of claim 8, wherein at least one of said first and second mounting members may be repositioned with respect to said first and second elongated members by threading said turn screws relative to threaded receptacles associated with said elongated members.

10. A device for enhancing traction of a vehicle, comprising:
    (a) an elongated cross member assembly having a first end, a second end, a pair of mounting plates, and a pair of spaced brackets, one of said pair of mounting plates being mounted to each of said first end and said second end, said elongated cross member being adapted to be mounted to a vehicle's frame;

(b) first and second gusset brackets, said first gusset bracket being mounted to one of said pair of mounting plates and the second gusset bracket being mounted to the other of said pair of mounting plates;

(c) first and second elongated members including first mounting members at first ends thereof and second mounting members at second ends thereof, said first mounting members being adapted to be pivotally mounted to said spaced brackets; and (d) first and second clevis brackets adapted to be mounted to a vehicle's front suspension, said second mounting members of said elongated members being adapted to be pivotally mounted to said first and second clevis brackets;

wherein at least one of said first and second mounting members may be repositioned with respect to said first and second elongated members to adjust lengths thereof, thereby facilitating pivotal motion of said first and second elongated members relative to said pair of spaced brackets and said first and second clevis brackets.

11. The device of claim 10, wherein said first and second gusset brackets include flanges and said flanges are adapted to be mounted to said vehicle's frame.

12. The device of claim 10, wherein said cross member is fabricated from a hollow rod and wherein said pair of spaced brackets are welded thereto.

13. The device of claim 10, wherein each of said pair of spaced brackets include first and second side plates, and said first and second side plates each include a plurality of aligned apertures that are adapted to receive a bolt therethrough.

14. The device of claim 10, wherein said first and second elongated members are fabricated from hollow rods.

15. The device of claim 10, wherein said first and second elongated members include receptacles at said first and second ends thereof, said receptacles being internally threaded.

16. The device of claim 10, wherein said first and second mounting members include threaded turn screws having rod ends joined thereto, said rod ends defining an inner diameter sized and configured to receive a bolt therethrough.

17. The device of claim 16, wherein at least one of said first and second mounting members may be repositioned with respect to said first and second elongated members by threading said turn screws relative to threaded receptacles associated with said elongated members.

* * * * *